(12) United States Patent
Zhao

(10) Patent No.: US 11,275,013 B1
(45) Date of Patent: Mar. 15, 2022

(54) METHODS AND APPARATUS FOR IMPROVED SAMPLE VISUALIZATION

(71) Applicant: Labrador Diagnostics LLC, Wilmington, DE (US)

(72) Inventor: Peiqian Zhao, Mountain View, CA (US)

(73) Assignee: Labrador Diagnostics LLC, Wilmington, DE (US)

( * ) Notice: Subject to any disclaimer, the term of this patent is extended or adjusted under 35 U.S.C. 154(b) by 0 days.

(21) Appl. No.: 16/040,131

(22) Filed: Jul. 19, 2018

Related U.S. Application Data

(60) Provisional application No. 62/534,628, filed on Jul. 19, 2017.

(51) Int. Cl.
| | | |
|---|---|---|
| *G01N 15/08* | (2006.01) | |
| *G01N 15/02* | (2006.01) | |
| *G01N 15/14* | (2006.01) | |

(52) U.S. Cl.
CPC ..... *G01N 15/0806* (2013.01); *G01N 15/0227* (2013.01); *G01N 2015/0846* (2013.01); *G01N 2015/145* (2013.01)

(58) Field of Classification Search
CPC ............. B01L 3/5453; A61B 5/150786; B07C 5/3412; B65H 2220/03; B65G 51/42; B65G 51/44; B65G 2203/0216
See application file for complete search history.

(56) References Cited

U.S. PATENT DOCUMENTS

| | | | | |
|---|---|---|---|---|
| 6,392,754 | B1* | 5/2002 | Pingel | G01B 11/255 356/239.1 |
| 7,075,631 | B2* | 7/2006 | Schnell | G01F 23/292 356/73.1 |
| 2002/0131707 | A1* | 9/2002 | Kopp | G02B 6/02085 385/37 |
| 2013/0247519 | A1* | 9/2013 | Clark | B65B 57/00 53/452 |
| 2014/0333920 | A1* | 11/2014 | Mander | G01N 21/3504 356/51 |
| 2015/0109608 | A1* | 4/2015 | Kim | G01N 21/314 356/40 |
| 2015/0112629 | A1* | 4/2015 | Hattori | G01N 21/59 702/100 |
| 2016/0252447 | A1* | 9/2016 | Kotz | G01N 21/6428 435/288.7 |
| 2016/0320288 | A1* | 11/2016 | Fortin | G01N 15/1436 |
| 2017/0227521 | A1* | 8/2017 | Cafferty | G01N 21/0303 |

\* cited by examiner

*Primary Examiner* — Dominic J Bologna

(57) ABSTRACT

Methods and devices are provided for use with a biological sample, wherein in one example, the device comprising a sample holder and an excitation source for providing excitation energy into the light conduit towards the sample holder. In one embodiment, the device comprises an imaging cytometer. Optionally, the device comprises a flow cytometer. Optionally, a light conduit comprises an optical fiber. Optionally, the optical fiber has an outer cross-sectional shape different from an inner optical core cross-sectional shape.

6 Claims, 18 Drawing Sheets

METHODS AND APPARATUS FOR IMPROVED SAMPLE VISUALIZATION

CROSS-REFERENCE TO RELATED APPLICATION

This application claims priority to U.S. Provisional Application Ser. No. 62/534,628 filed Jul. 19, 2017, which is fully incorporated herein by reference for all purposes.

BACKGROUND

In imaging cytometry, laser or laser diodes are usually used to directly illuminate the biological samples located on the focal plane of a microscope objective. The laser beam out of a laser diode (or a laser) has a Gaussian distribution in intensity (called Gaussian beam) regardless how many lenses the beam goes through. Therefore, the biological sample will be illuminated by the light whose intensity distribution at sample plane is Gaussian in shape, see FIG. 1. This could potentially reduce the fluorophore dynamic range and/or photobleaching in the high intensity area while other area is under illuminated, which could reduce the measurement accuracy.

Thus, known techniques have various drawbacks and are overly cumbersome and costly in their implementation.

INCORPORATION BY REFERENCE

All publications, patents, and patent applications mentioned in this specification are herein incorporated by reference to the same extent as if each individual publication, patent, or patent application was specifically and individually indicated to be incorporated by reference.

COPYRIGHT

This document contains material subject to copyright protection. The copyright owner (Applicant herein) has no objection to facsimile reproduction of the patent documents and disclosures, as they appear in the US Patent and Trademark Office patent file or records, but otherwise reserves all copyright rights whatsoever. The following notice shall apply: Copyright 2016-2017 Theranos, Inc.

SUMMARY

The disadvantages associated with the prior art are overcome by embodiments described herein.

In one embodiment herein, to get enough fluorescence signal in the under illuminated area, longer exposure time can be used, which could be combined with increased the data process speed. Optionally, one could get more uniform illumination across the biological sample area by only using the center area of the Gaussian beam. However, this is at the cost of throwing out significant amount of light, which reduces illumination efficiency and could lead to other issues, such as, in the case of large field of view application, where more total light power is needed and one could not find lasers with enough power. In at least some embodiments described herein, these issues are addressed by delivering efficient and uniform illumination at the biological sample plane through several methods.

In one embodiment, a device is provided for use with a biological sample, the device comprising a sample holder; a light conduit with a shaped core; and an excitation source for providing excitation energy into the light conduit towards the sample holder. In one embodiment, the device comprises an imaging cytometer. Optionally, the device comprises a flow cytometer. Optionally, the light conduit comprises an optical fiber. Optionally, the optical fiber has an outer cross-sectional shape different from an inner optical core cross-sectional shape.

In another embodiment, a device is provided for use with a biological sample, the device having an optical guide that shapes an illuminated area of excitation energy to match a region of interest.

In yet another embodiment, a method is provided for use with a biological sample comprising shaping an illuminated area of excitation energy to match a region of interest.

In still another embodiment, a method is provided for use with a biological sample, the method comprising using a light conduit with a shaped core to direct excitation energy from an excitation source to the biological sample It should be understood that embodiments in this disclosure may be adapted to have one or more of the features described below. In one nonlimiting example, the sample may be plasma. Optionally, in some embodiments, the sample may be serum. Optionally, in some embodiments, any of the foregoing may be from capillary blood. Optionally, in some embodiments, any of the foregoing may be from venous whole blood. Optionally, in some embodiments, the sample may be capillary blood. Optionally, in some embodiments, the sample may be venous whole blood.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DESCRIPTION OF THE SPECIFIC EMBODIMENTS

Figure 1:
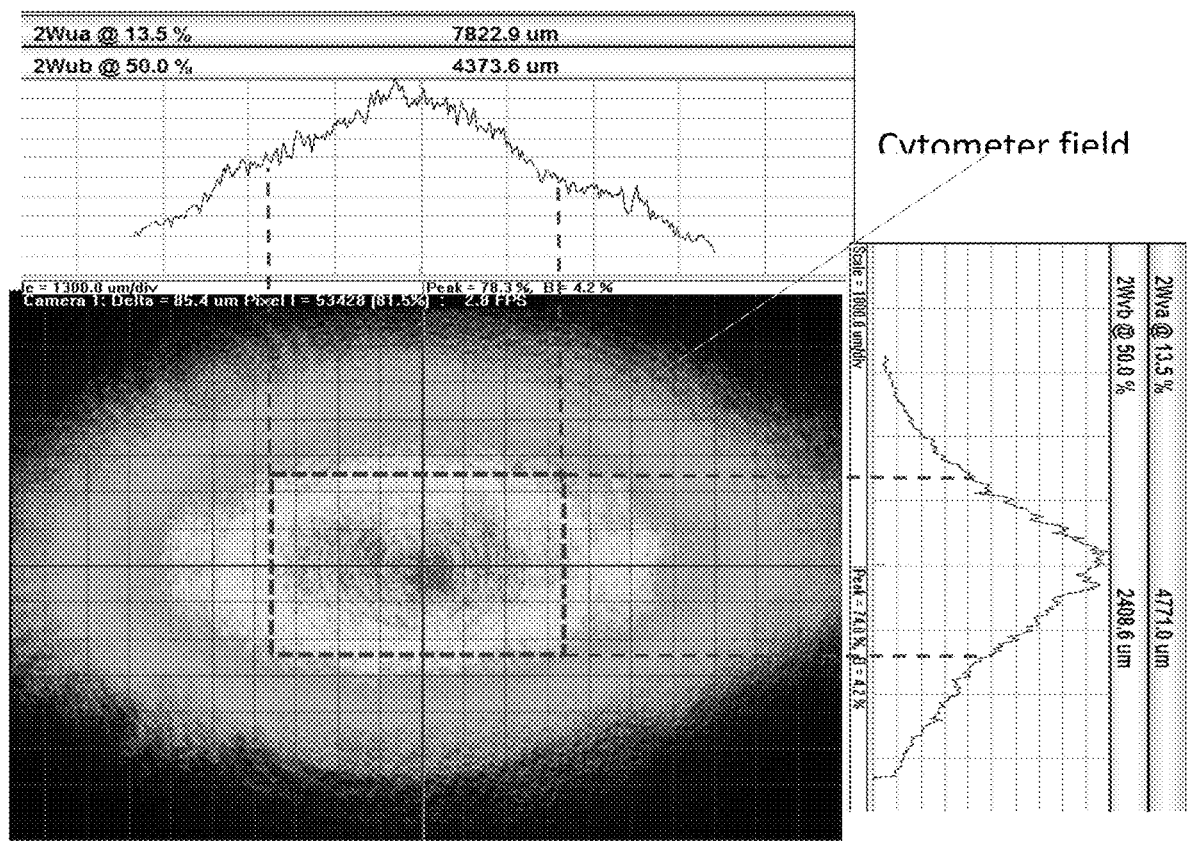
FIG. 1. Biological sample area (red rectangle) at a microscope objective focal plane is illuminated by a Gaussian beam.

It is to be understood that both the foregoing general description and the following detailed description are exemplary and explanatory only and are not restrictive of the invention, as claimed. It may be noted that, as used in the specification and the appended claims, the singular forms "a", "an" and "the" include plural referents unless the context clearly dictates otherwise. Thus, for example, reference to "a material" may include mixtures of materials, reference to "a compound" may include multiple compounds, and the like. References cited herein are hereby incorporated by reference in their entirety, except to the extent that they conflict with teachings explicitly set forth in this specification.

In this specification and in the claims which follow, reference will be made to a number of terms which shall be defined to have the following meanings:

"Optional" or "optionally" means that the subsequently described circumstance may or may not occur, so that the description includes instances where the circumstance occurs and instances where it does not. For example, if a device optionally contains a feature for a sample collection unit, this means that the sample collection unit may or may not be present, and, thus, the description includes both structures wherein a device possesses the sample collection unit and structures wherein sample collection unit is not present.

As used herein, the terms "substantial" means more than a minimal or insignificant amount; and "substantially" means more than a minimally or insignificantly. Thus, for example, the phrase "substantially different", as used herein, denotes a sufficiently high degree of difference between two numeric values such that one of skill in the art would consider the difference between the two values to be of statistical significance within the context of the characteristic measured by said values. Thus, the difference between two values that are substantially different from each other is typically greater than about 10%, and may be greater than about 20%, preferably greater than about 30%, preferably greater than about 40%, preferably greater than about 50% as a function of the reference value or comparator value.

As used herein, a "sample" may be but is not limited to a blood sample, or a portion of a blood sample, may be of any suitable size or volume, and is preferably of small size or volume. In some embodiments of the assays and methods disclosed herein, measurements may be made using a small volume blood sample, or no more than a small volume portion of a blood sample, where a small volume comprises no more than about 5 mL; or comprises no more than about 3 mL; or comprises no more than about 2 mL; or comprises no more than about 1 mL; or comprises no more than about 500 µL; or comprises no more than about 250 µL; or comprises no more than about 100 µL; or comprises no more than about 75 µL; or comprises no more than about 50 µL; or comprises no more than about 35 µL; or comprises no more than about 25 µL; or comprises no more than about 20 µL; or comprises no more than about 15 µL; or comprises no more than about 10 µL; or comprises no more than about 8 µL; or comprises no more than about 6 µL; or comprises no more than about 5 µL; or comprises no more than about 4 µL; or comprises no more than about 3 µL; or comprises no more than about 2 µL; or comprises no more than about 1 µL; or comprises no more than about 0.8 µL; or comprises no more than about 0.5 µL; or comprises no more than about 0.3 µL; or comprises no more than about 0.2 µL; or comprises no more than about 0.1 µL; or comprises no more than about 0.05 µL; or comprises no more than about 0.01 µL.

As used herein, the term "point of service location" may include locations where a subject may receive a service (e.g. testing, monitoring, treatment, diagnosis, guidance, sample collection, ID verification, medical services, non-medical services, etc.), and may include, without limitation, a subject's home, a subject's business, the location of a healthcare provider (e.g., doctor), hospitals, emergency rooms, operating rooms, clinics, health care professionals' offices, laboratories, retailers [e.g. pharmacies (e.g., retail pharmacy, clinical pharmacy, hospital pharmacy), drugstores, supermarkets, grocers, etc.], transportation vehicles (e.g. car, boat, truck, bus, airplane, motorcycle, ambulance, mobile unit, fire engine/truck, emergency vehicle, law enforcement vehicle, police car, or other vehicle configured to transport a subject from one point to another, etc.), traveling medical care units, mobile units, schools, day-care centers, security screening locations, combat locations, health assisted living residences, government offices, office buildings, tents, bodily fluid sample acquisition sites (e.g. blood collection centers), sites at or near an entrance to a location that a subject may wish to access, sites on or near a device that a subject may wish to access (e.g., the location of a computer if the subject wishes to access the computer), a location where a sample processing device receives a sample, or any other point of service location described elsewhere herein.

Figure 2:
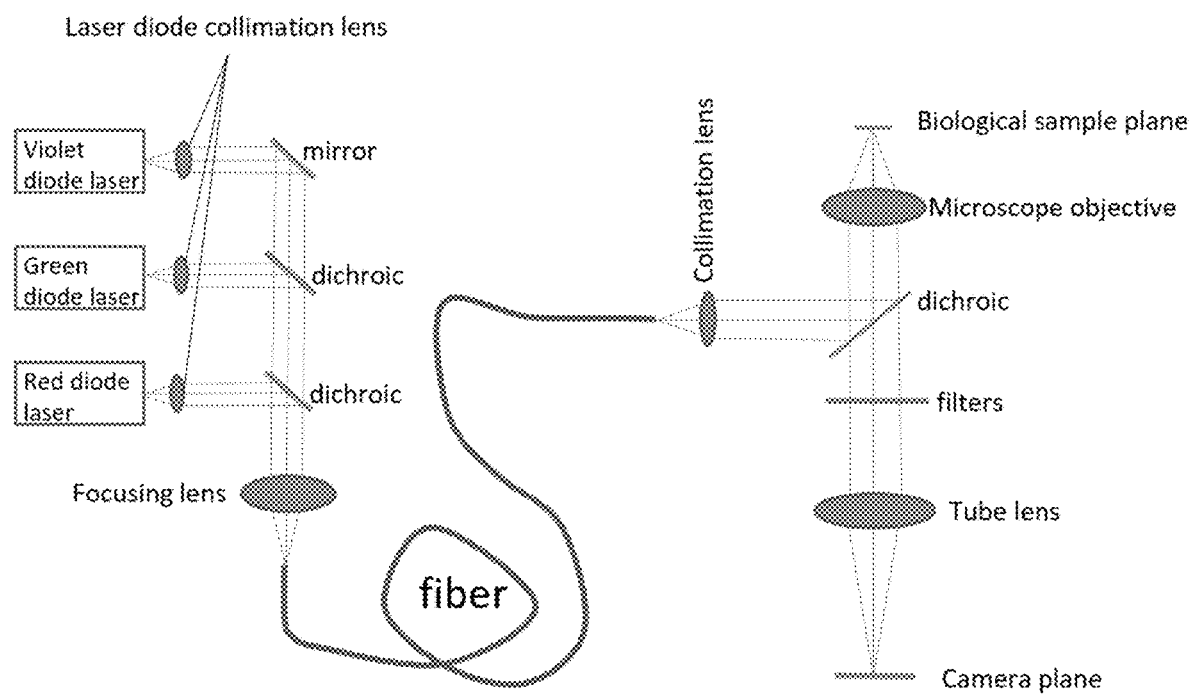
FIG. 2 shows a diagram of a fiber based illumination system to deliver stable and uniform illumination at the biological sample plane of an imaging cytometer.

In embodiments, methods and apparatus are described to deliver efficient, stable and uniform illumination at the biological sample plane of an imaging cytometer. FIG. 2 is a schematic diagram showing one non-limiting example of a method of delivering stable and uniform illumination at the biological sample plane of an imaging cytometer. After going through the mirror, and dichroics, collimated beams from violet laser diode, green laser diode, red laser diode and their corresponding collimation lenses are focused onto a fiber input end by a focusing lens. In one non-limiting example, the fiber receiving the collimated light has a square core or rectangle core to match or substantially match the biological sample field shape which is determined by the format of the camera sensor used in the fluorescence/scattering collection path. In such an embodiment, the core of the fiber has the square, rectangular, hexagonal, polygonal, other cross-sectional shapes, or single or multiple combinations of cross-sectional shapes configured to correspond or substantially correspond with the shape of the sample field shape or shape of the sensor receiving signal from the sample. Optionally, the fiber may have cladding or other material so that the outer cross-sectional shape of the fiber is circular, oval, or other shape different from the cross-sectional shape of the core. Optionally, the outer surface cross-sectional shape is similar to that of the inner cross-sectional shape that is light carrying. Optionally, some embodiments may have multiple fibers for delivery of excitation energy. Optionally, some embodiment may use multi-core fiber. Optionally, instead of a fiber, other light conduits (optical waveguide) that can shape the beam from a first shape to a second, different shape may also be used.

In one nonlimiting example, at the output end of the fiber, a collimation lens collimates the beam from the fiber. And the collimated beam, after reflected by a dichroic, is focused on the biological sample plane by the microscope objective lens. Therefore, in one embodiment, the fiber output end is imaged onto the biological sample plane by the collimation lens and the objective lens. The illuminated area at the biological sample plane will be similar in shape to the fiber core shape, such as square, rectangle, or other shape of the fiber core. The irradiance of the illuminated area at the sample plane will be very uniform.

Figure 3:
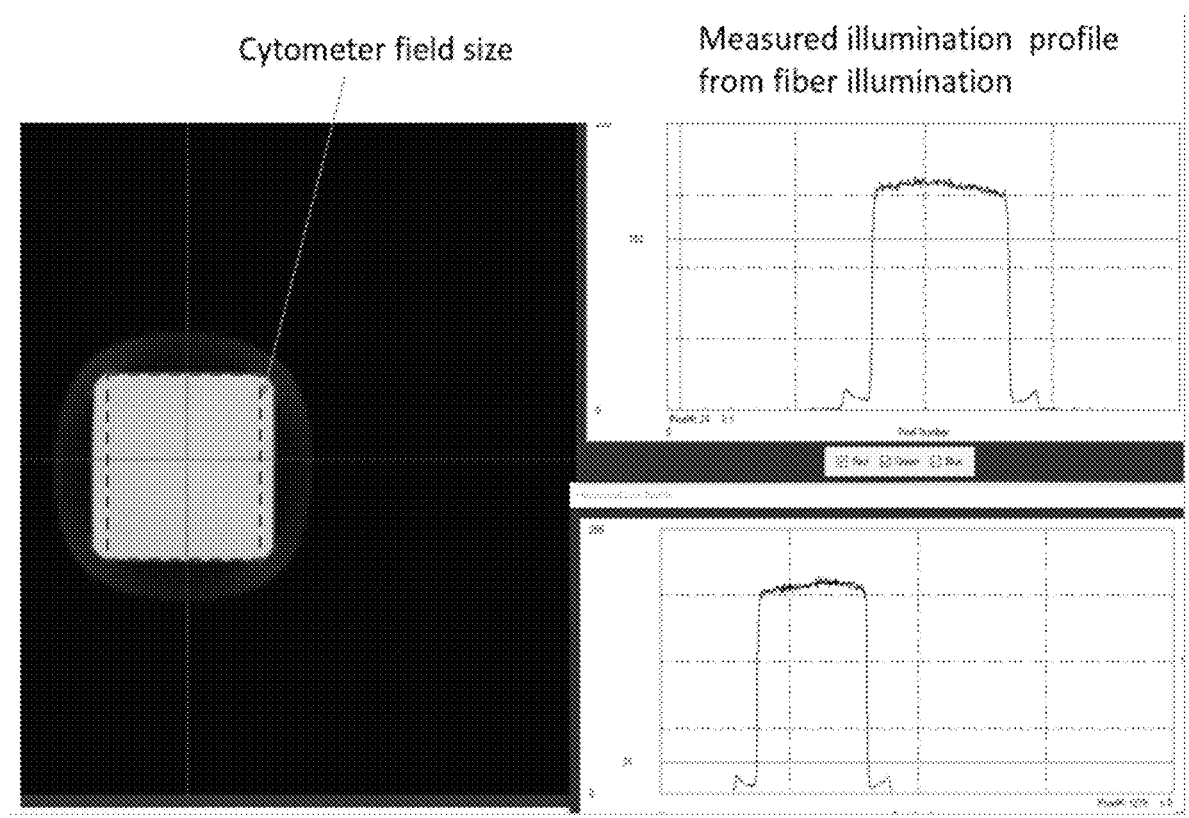
FIG. 3 shows measured illuminated area shape and illumination uniformity at a biological sample plane.
Figure 4A:
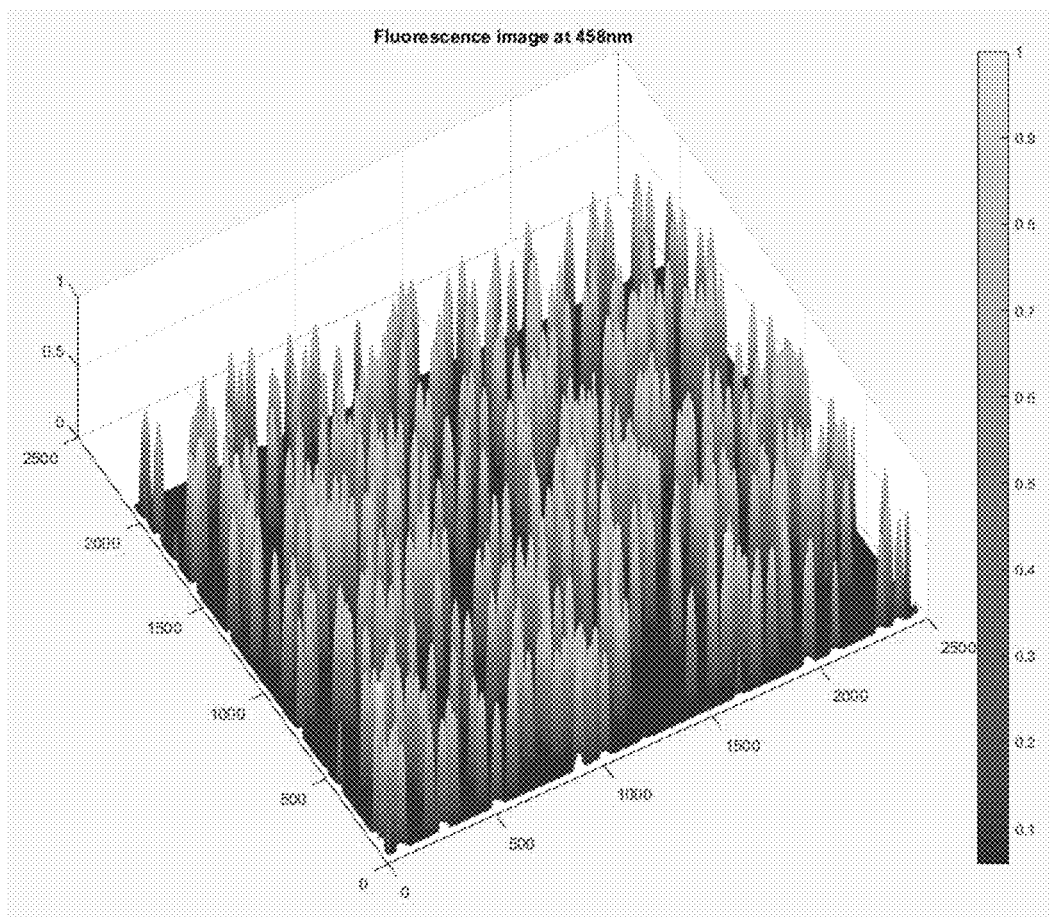
FIG. 4A shows fluorescence images of beads at wavelength 458 nm excited by violet light.
Figure 4B:
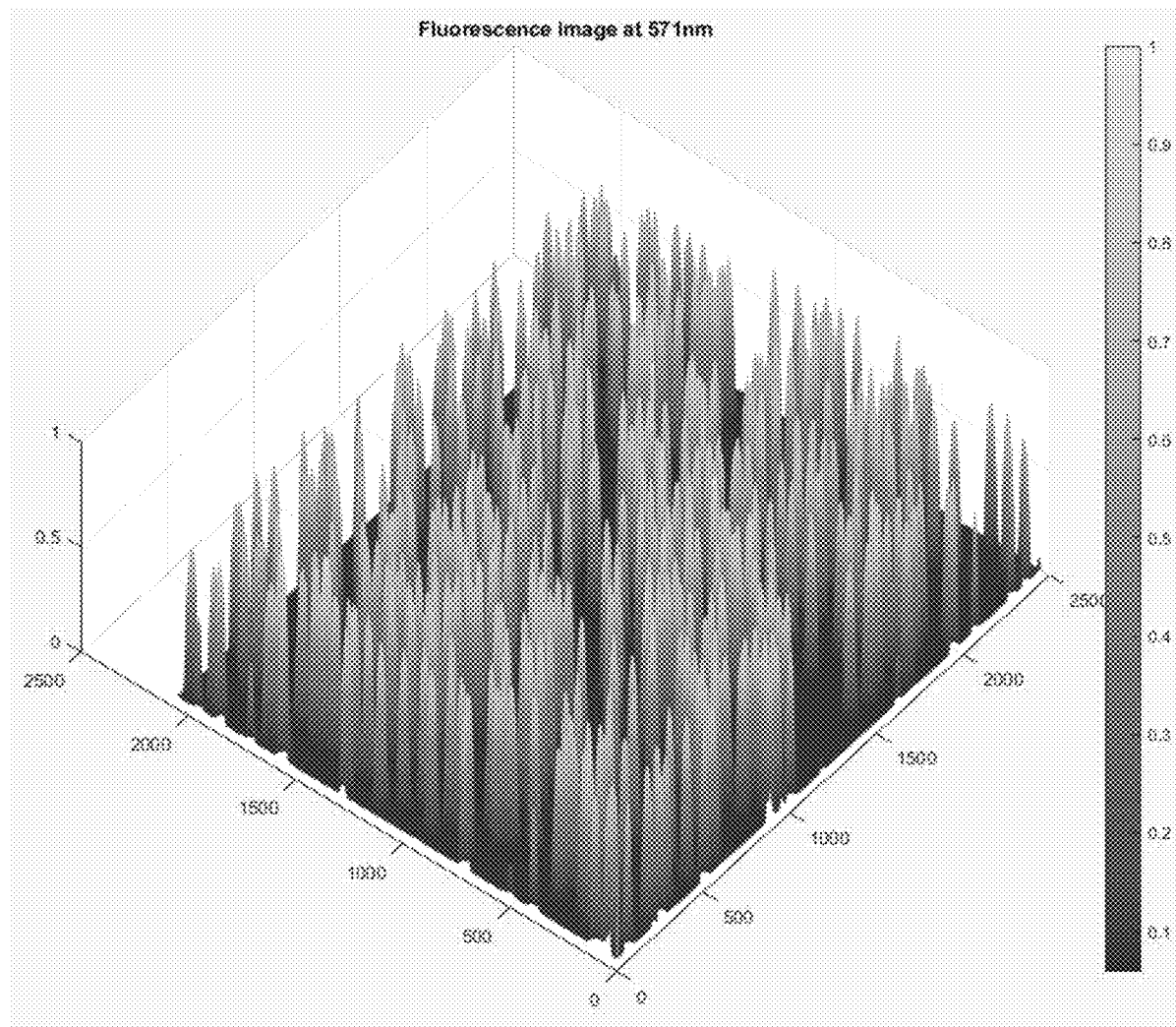
FIG. 4B shows fluorescence images of beads at wavelength 458 nm excited by green light.
Figure 4C:
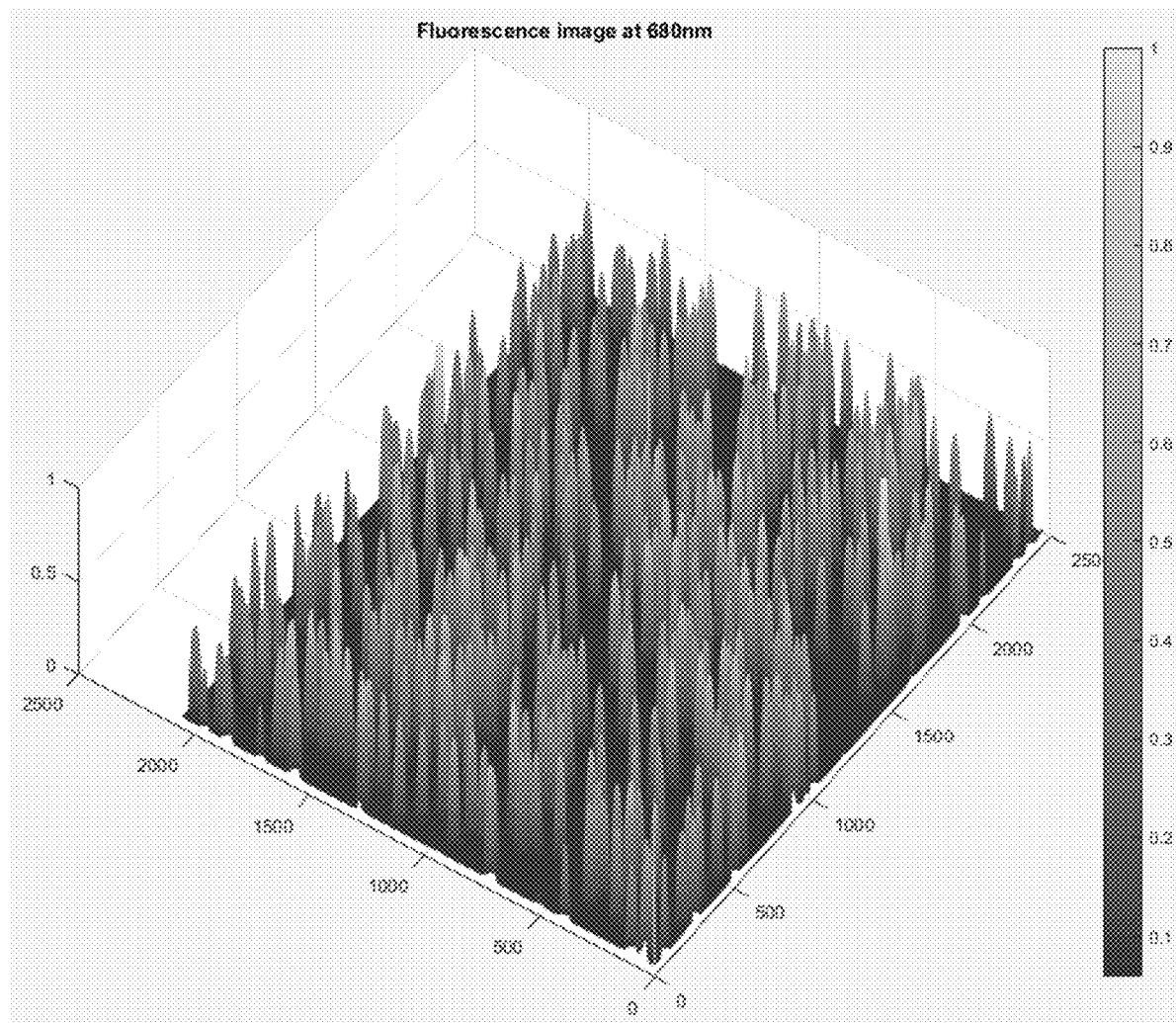
FIG. 4C shows fluorescence images of beads at wavelength 680 nm excited by red light.
Figure 4D:
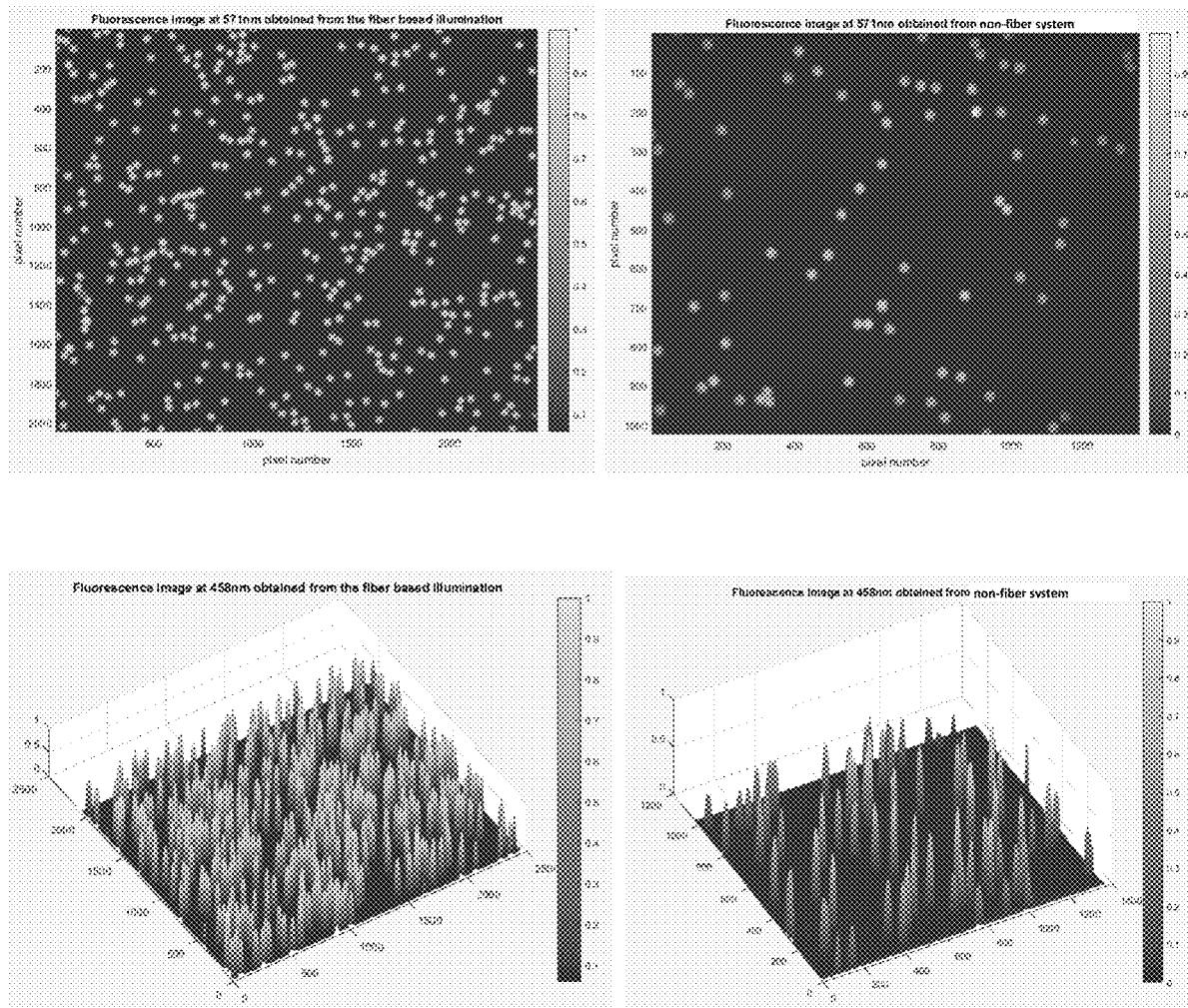
FIG. 4D-4E compare images using the fiber-based system versus images from a non-fiber system.
Figure 4E:
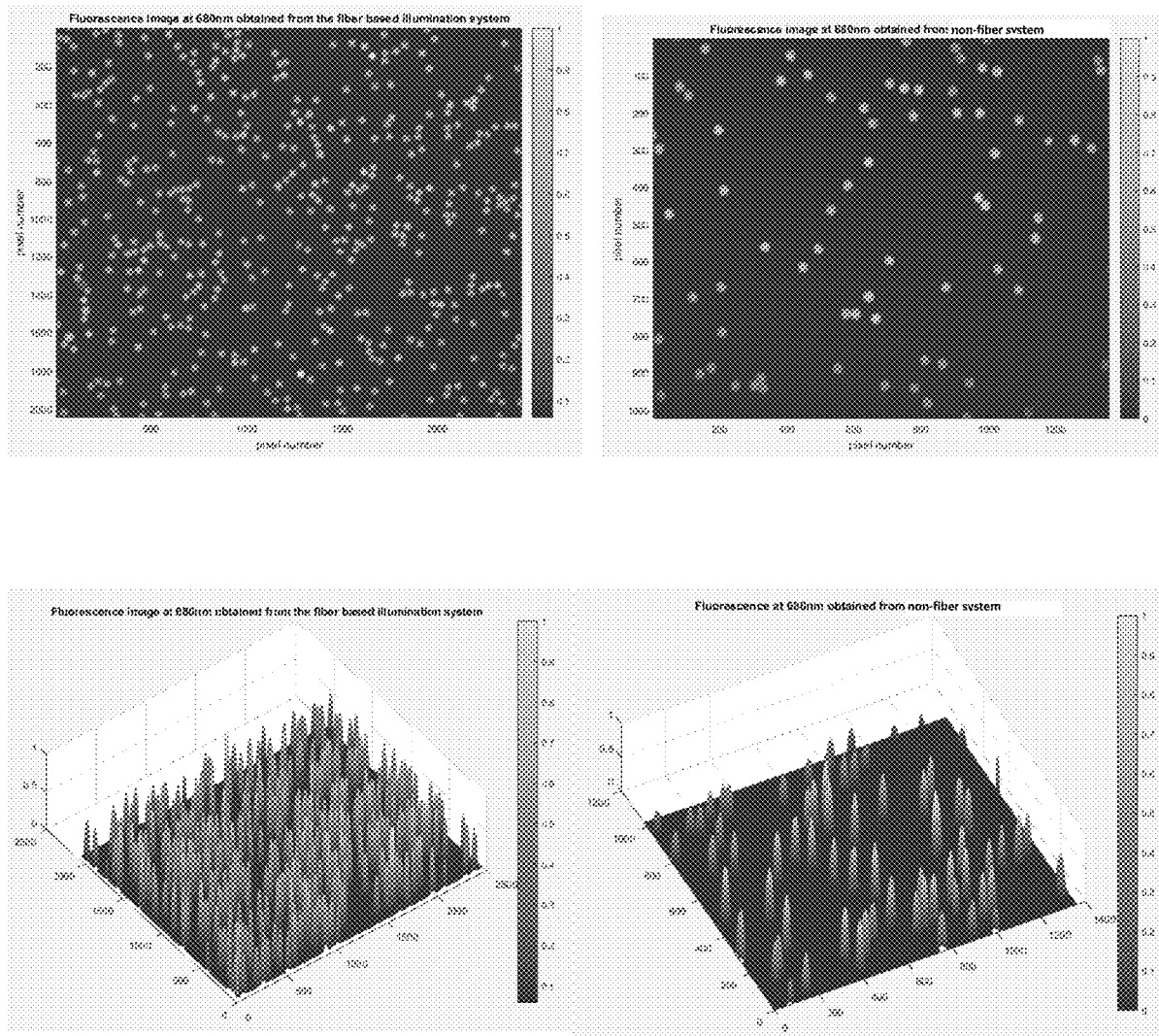

FIG. 3 shows a test result from a system with a square core fiber and violet laser diode as the light source. One can see that, in addition to the very uniform illumination area, when compared to that in FIG. 1, the illumination area fits the rectangular sample field well, so there is less light is threw out, resulting in high efficiency. Actually, the fiber can be drew with rectangular to match the sample field shape well to further improve the efficiency. With laser light excitation, biological sample emits fluorescence light which will first collimated by the objective lens, goes through a dichroic and a filter(s) and is imaged onto the camera sensor plane by the tube lens. FIGS. 4(a), 4(b) and 4(c) shows the fluorescence images excited by violet, green and red light captured by the camera at fluorescence wavelength of 458 nm, 571 nm and 680 nm respectively. In at least one embodiment, a 0.8 mm×0.8 mm uses a 2 meter length fiber. In a 0.4 mm×0.4 mm uses a 10 meter length fiber. One can establish a relationship between the core size and a minimum fiber length as described above by the ratio shown above of cross-sectional area versus fiber length.

For at least some of the embodiments herein, the illumination efficiency is high. Compared to the direct laser beam illumination method, there is much less light falling outside the sample field size. For same sample field size, laser diode with less output power can be used, generating less heat, hence delivering stable illumination. Or, this method makes it possible to design and build very large field image cytometer with available laser diodes.

For at least some of the embodiments herein, uniform illumination is achieved. As shown in FIG. 3, this method delivers very uniform illumination at the biological sample plane. This will improve the measurement accuracy of a cytometer and will be more tolerable to the fluorophore brightness variation and bead/cell size variation. It also shorten the integration time for same cell/bead and for fluorophore brightness. Uniform illumination also prevents the possibility of photobleaching at the center area while field corner is under illuminated as shown in FIG. 1.

For at least some of the embodiments herein, illumination intensity at sample plane is more stable from cytometer unit to unit. For same driving current, the optical output power varies much from laser diode to laser diode. To get constant output power, one has to change the driving current. However, the divergence angle of a laser diode changes very much. Therefore, for the laser beam direct illumination method, the illuminated area at sample plane will change by the same amount accordingly as the laser divergence angle does. The consequence is that the illumination intensity, which is the key for fluorescence generation, at sample plane will vary a lot from cytometer unit to unit. With the illumination method described in this invention, the fiber will collect all the light from a laser diode and deliver the light to the sample plane. The total light and the intensity (light per area) at biological sample plane are not sensitive to the laser beam divergence angle variation. As long as the laser diode emits constant power, the fiber will deliver constant total power at the sample plane. Since the fiber core size and shape is very constant (<1%), the illuminated area size and shape at sample plane will be constant. Therefore, the illumination intensity will also be constant from cytometer unit to unit.

Figure 5:
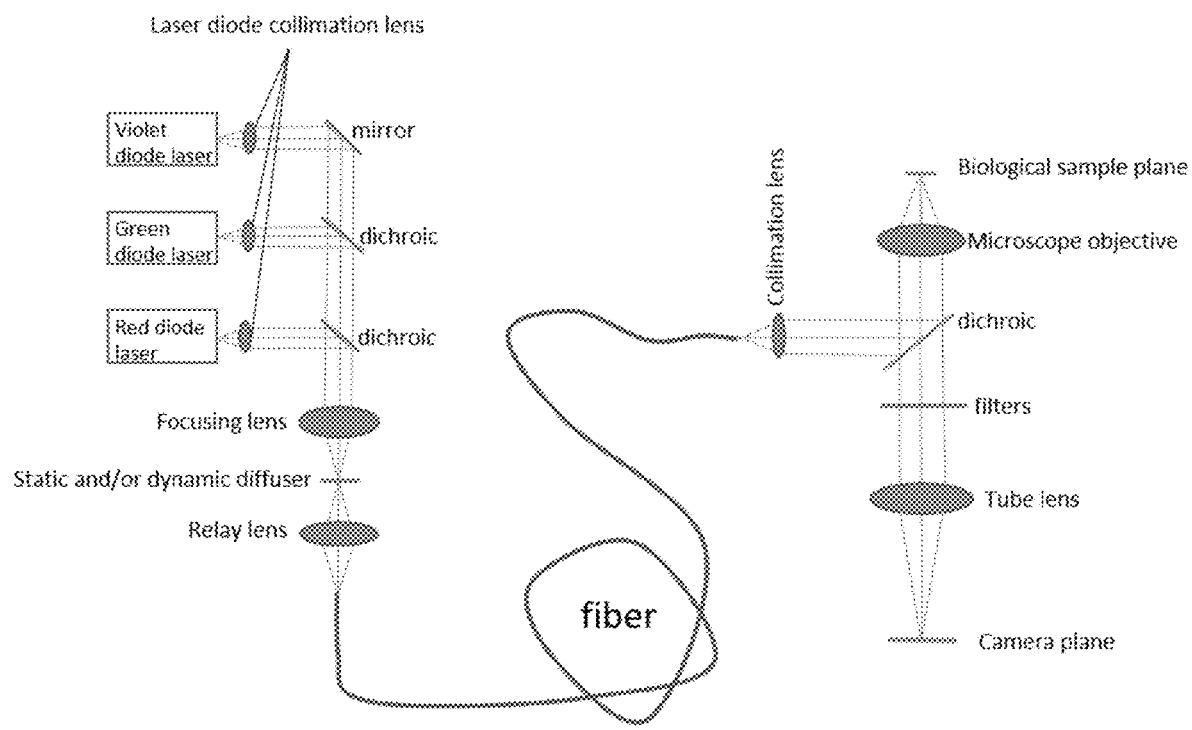
FIG. 5 is a schematic showing an alternative means of implementing fiber based illumination.

Optionally, one of the alternative techniques or methods is shown schematically in FIG. 5. The three collimated beams from each of the three laser diodes and their corresponding collimation lens go through mirror and/or dichroics and are focused on a plane by the focusing lens. At that focal plane, a static and/or a dynamic diffuser are placed. A dynamic optical diffuser is a diffuser which moves around with time, such as a laser speckle reducer. A relay lens images the diffuser plane onto the fiber input end. All other parts are the same as those described in the previous section.

Figure 6:
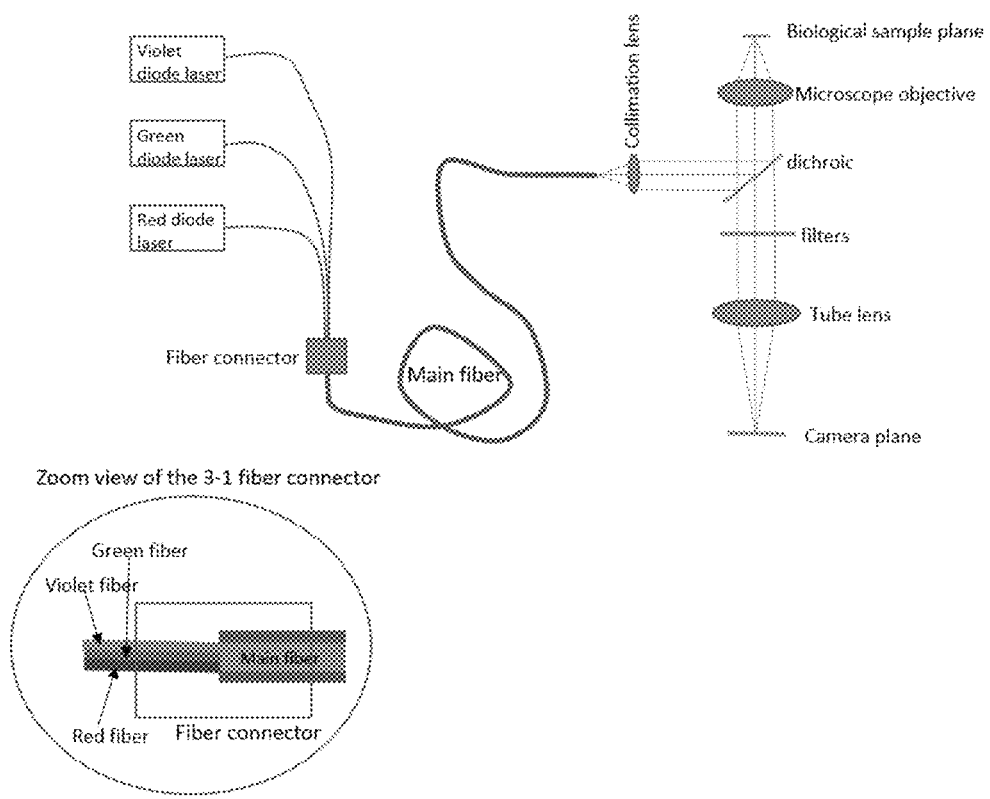
FIG. 6 is a schematic showing another alternative means of implementing fiber based illumination according to at least one embodiment herein.

Optionally, another alternative technique or method is schematically shown in FIG. 6. The light from each of the three laser diodes, such as violet laser diode, green laser diode and red laser diode, is directly coupled into individual fibers, e.g. violet fiber, green fiber and red fiber. The core of these three fibers can be either round, square or rectangle with rectangle as the preferred one since the laser diode emitting area is rectangle and the laser light can be easily coupled into fiber if the fiber core is rectangle. The output ends of these three fibers are bundled together and connected to the main fiber which has been described in the previous section. As described in previous section, it is preferred, but not a must, that the main fiber core is rectangle to match the sample field shape. The core size of the three violet, green and red fibers are smaller than the main fiber so that all the light from the individual three fibers are coupled into the main fiber. All other parts are the same as those described in previous section. In addition to the advantages described in previous sections, this method provide other advantages, it will make the illumination system insensitive to any vibration and the make the cytometer more compact.

Any of the modifications described in this document may be applied to imaging based cytometers such as but not limited to those described in PCT application PCT/US14/16962 filed Feb. 18, 2014, fully incorporated herein by reference. These modifications here may also be configured used in flow cytometers.

Figure 7:
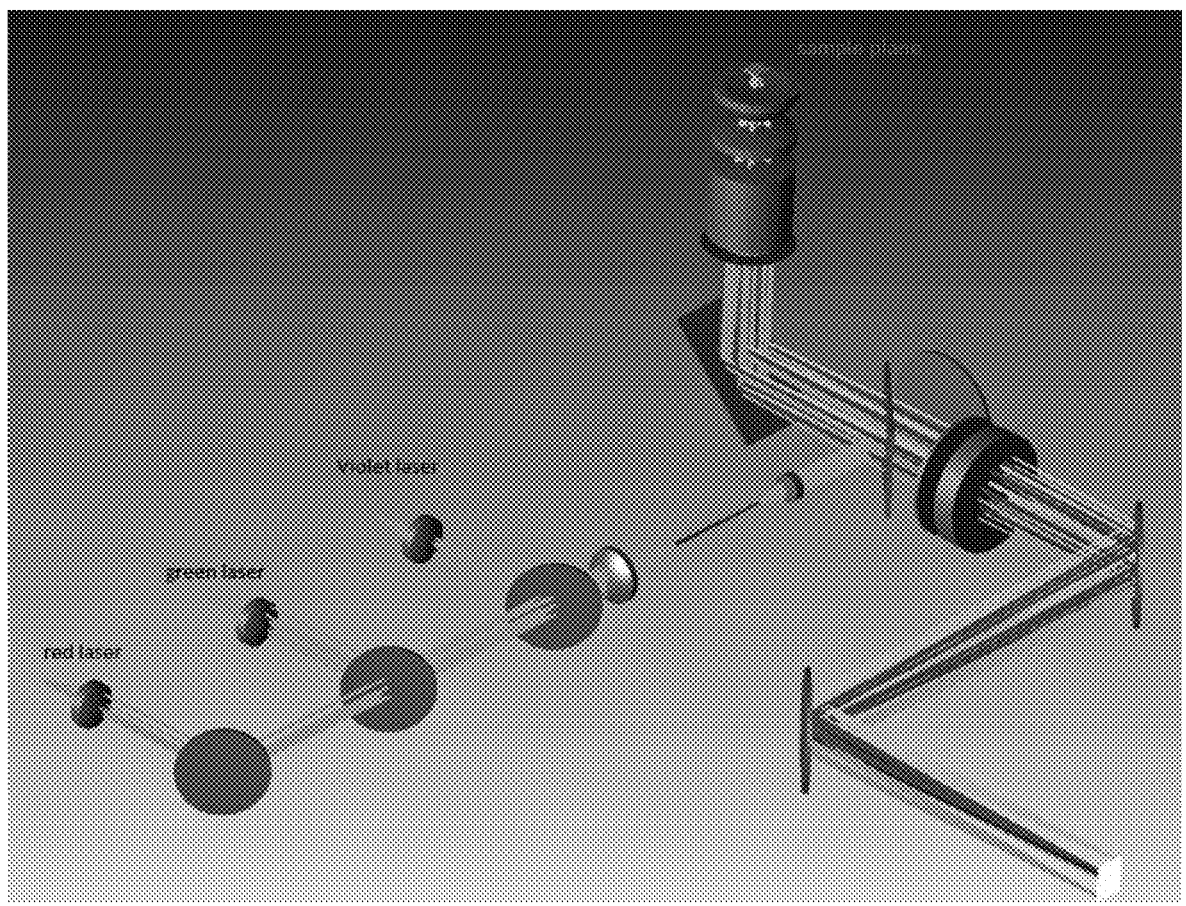
FIG. 7 is a perspective view of a system according to at least one embodiment described herein.

FIG. 7 is a perspective view of a system according to at least one embodiment described herein. This non-limiting example shows light sources, which in this example are the red, green, violet lasers, direct illumination energy through the objective to the sample plane where a cuvette is located with the sample. Excitation light, reflected light, or scattered light (depending on operating mode) travels down through the objective and then along a light path to at least one detector but more typically a plurality of detectors.

Figure 8:
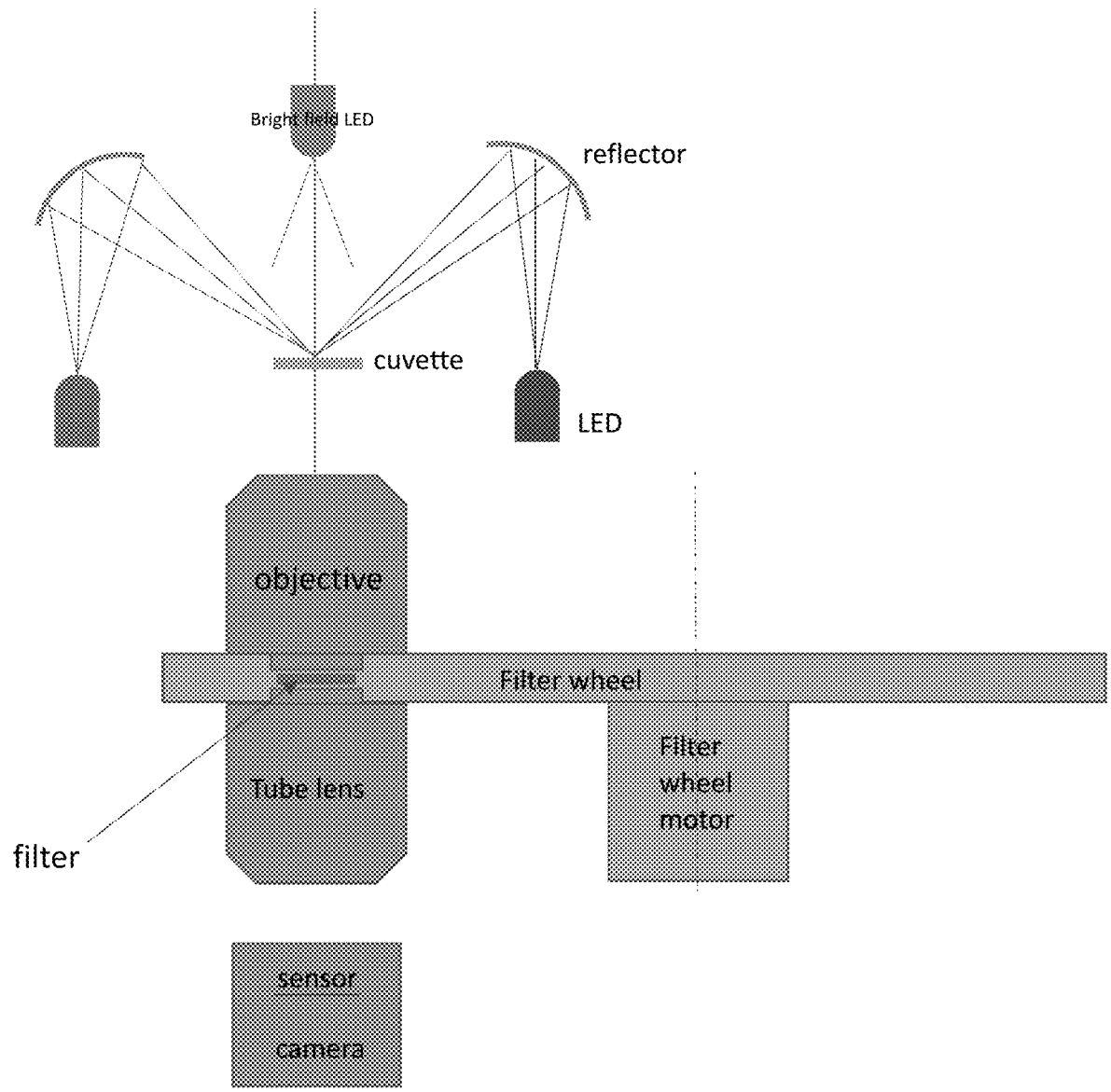
FIGS. 8-10 show still further embodiments as described herein.

Referring now to FIG. 8, a still further embodiment is shown. This embodiment may have a plurality of light sources, which in one non-limiting example may be a plurality of LEDs, in a ring or other configuration to provide illumination for scatter or florescence. As seen, a further light source (in this example, the bright field LED) can be provided for bright field illumination to illuminate the sample in the cuvette. Reflector(s) can be used to direct light from the light source to the cuvette. The reflector may be in a ring shape and have a curved cross-section as shown in FIG. 8.

As seen in FIG. 8, the light enters the objective wherein the light path intersects a portion a filter wheel with a plurality of optical filters. There may also be a lens or transparent cover over either side of the filter. The objective may be integrally formed with an objective. The filter wheel in the present embodiment may be coupled to a filter wheel motor or other actuator to position the desired filter in the light path from the objective to the tube lens. Although this embodiment uses a tube lens, the use of other types of lenses is not excluded.

As seen in FIG. 8, a sensor or a camera may be positioned at the end of the optical train to receive the signal. Optionally, some embodiments may use a plurality of optical sensors or cameras to receive light or optical signal at different wavelengths.

Figure 9:
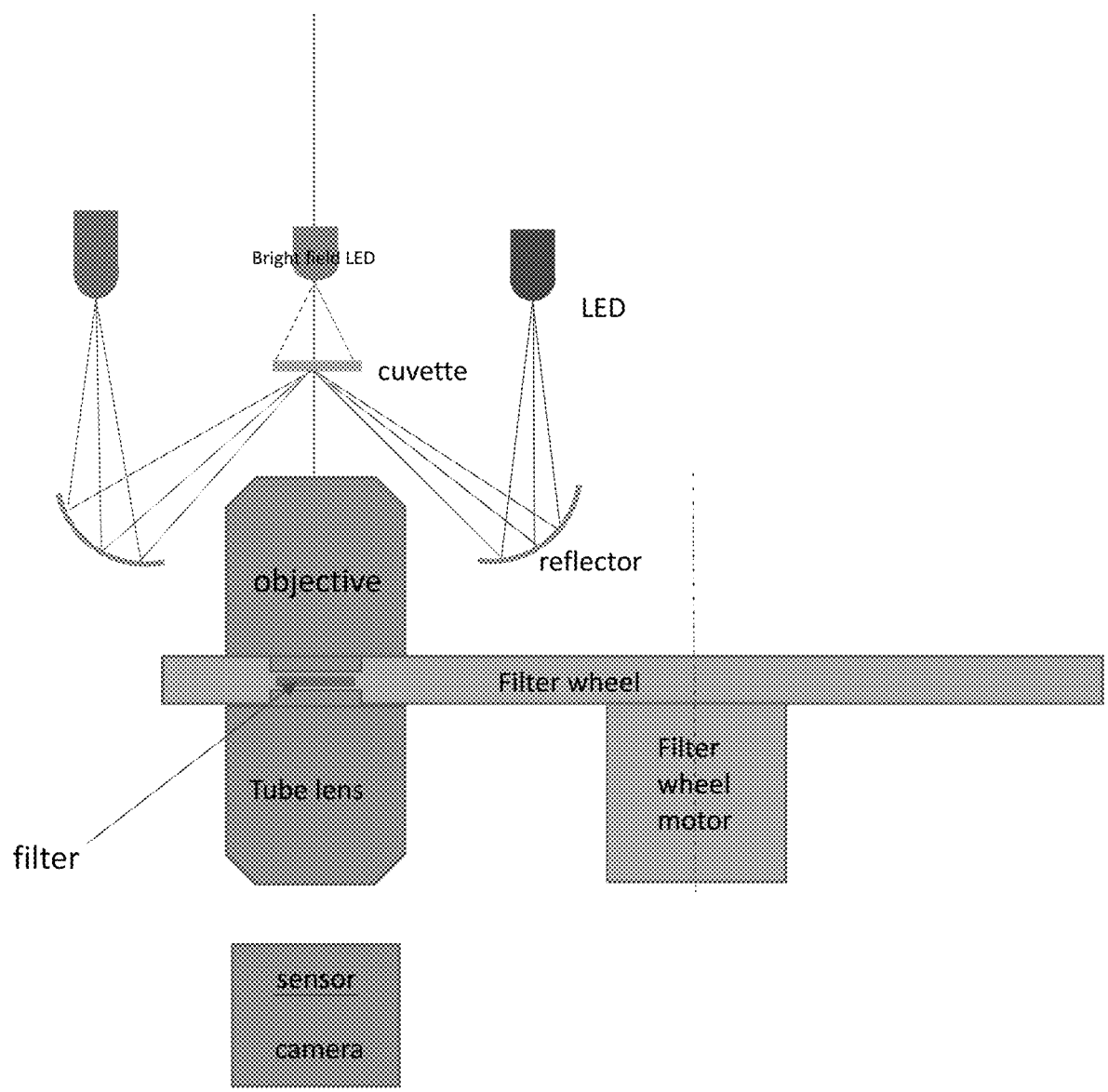

Referring now to FIG. 9, a still further embodiment will now be described. This embodiment shows all of the light sources (LEDs for fluorescent/scatter and bright field) located above the plane of the sample holder, which in the present example, is a planar cuvette. This embodiment shows a curved reflector below the plane of the cuvette that is illuminated by the light sources to direct light to the underside of the cuvette.

Emission signal from sample in the cuvette is directed towards the objective and then travel travels along a light path through optical components similar to those described in FIG. 8.

Figure 10:
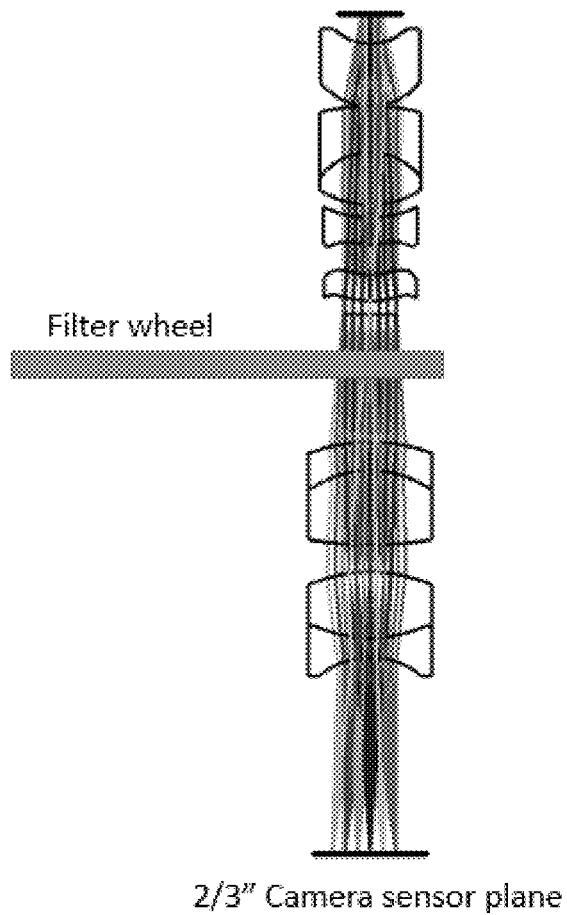

Referring now to FIG. 10, the optical pathway(s) from the sample carrier or cuvette, through lens, the color filter wheel, and additional lens before reaching the optical sensor.

Figure 11:
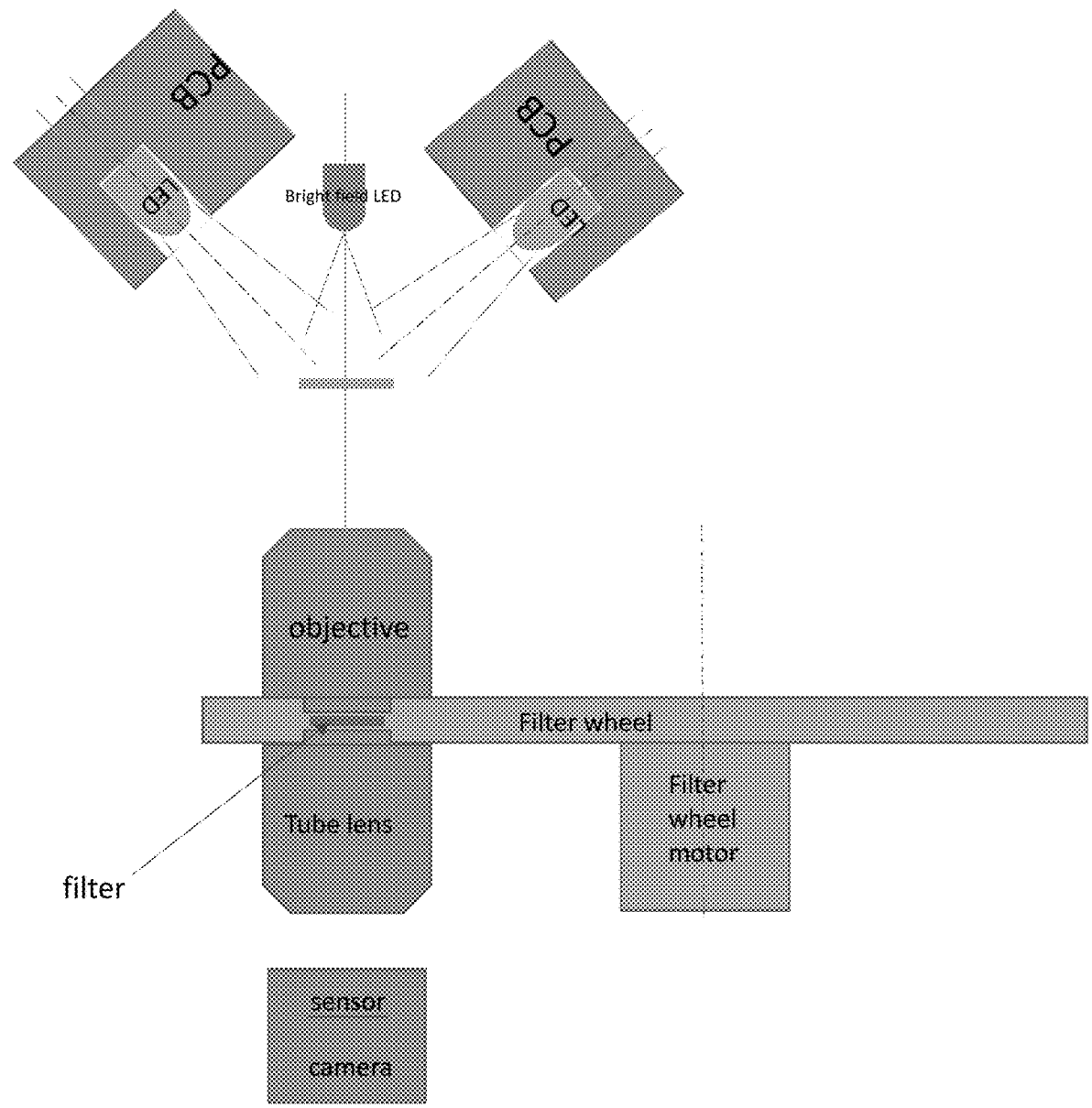
FIGS. 11-13 show still further embodiments with LEDs as described herein.
Figure 12:
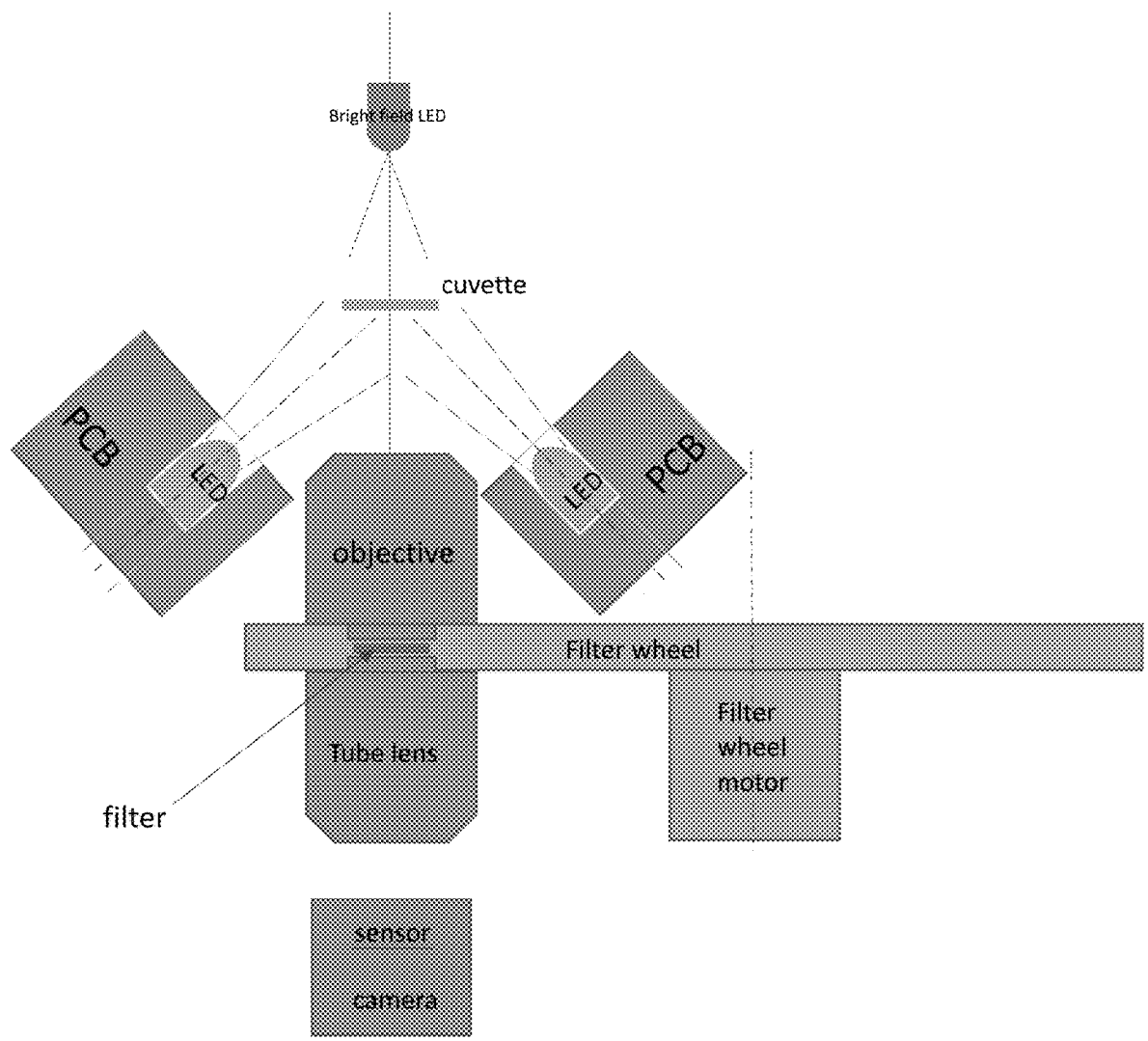
Figure 13:
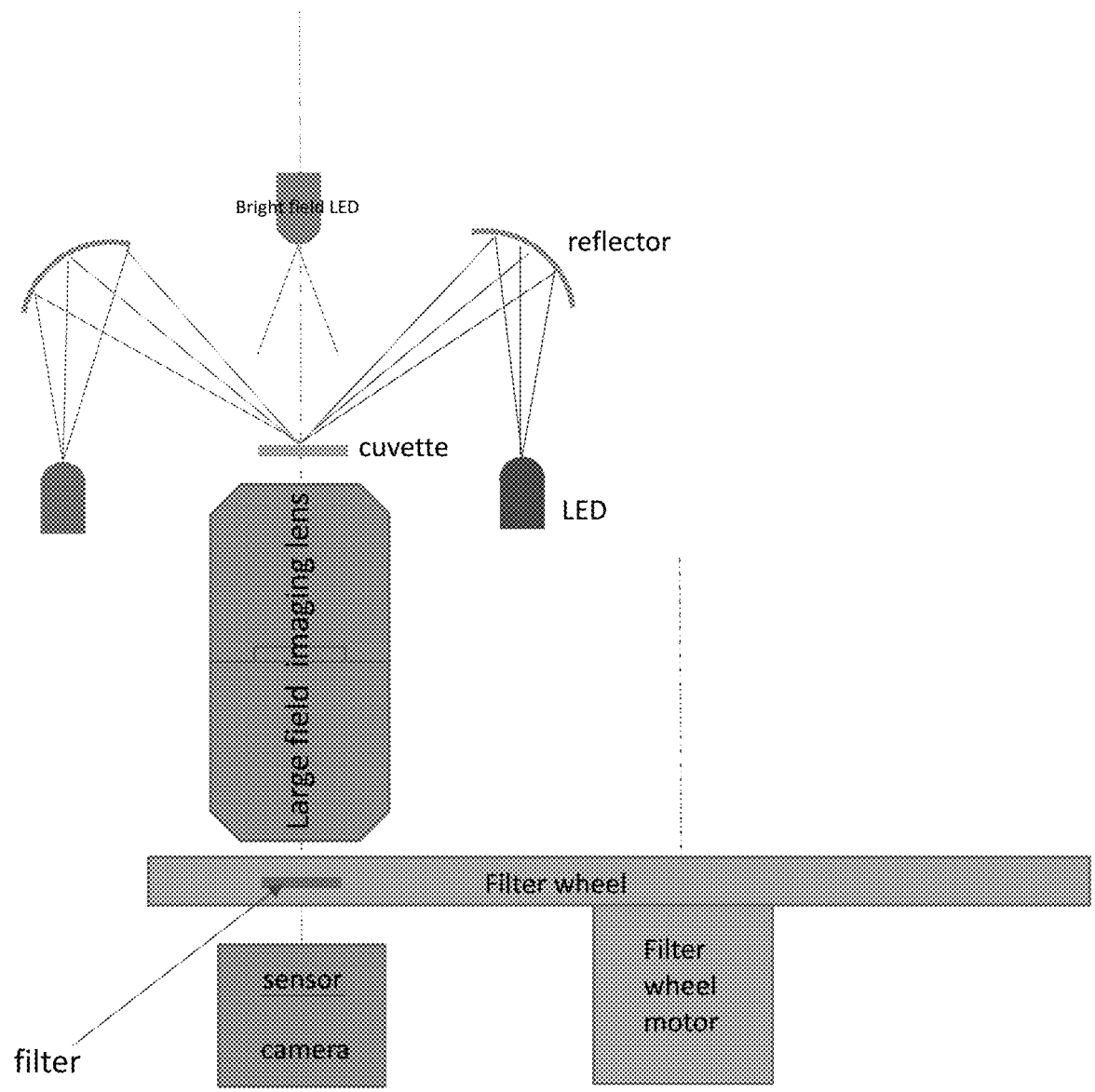

FIGS. 11 to 13 show still further embodiments of system configurations as described herein. FIGS. 11 and 12 both show embodiments using surface mounted LEDs wherein the printed circuit board or other support is mounted at an angle to provide the desired illumination, whether form above or below. FIG. 13 shows an embodiment with a large field imaging lens and LEDs or other illumination source reflected from curved reflectors.

The sample cuvette can be loaded from above and still illuminated from above by methods such as but not limited to using reflectors from above (with illumination source from below).

In one embodiment provides an integrated design for the objective to reduce vertical dimension. In one embodiment, this lens design is a one-piece design.

Illuminating from above or below the sample is also possible. In terms of optical efficiency, illuminating from below is more efficient. Fiber based embodiments can also be used for illumination for any of the embodiments herein, wherein a shaped optical fiber is used in the optical pathway from the illumination source to provide more uniform illumination.

Optionally, an LED ring (say eight LEDs) can be used to illuminate the sample. It should be understood that the reflector above can also be a ring configuration. In some embodiments, there may be a lens in front of the LED (for non-surface mount on board . . . to angle the LED).

Optionally, the board design can be configured to angle LED on PCB or place entire PCB at an angle. The illumination can be scatter illumination vs fluorescent illumination (wherein florescent light is much dimmer).

Figure 14:
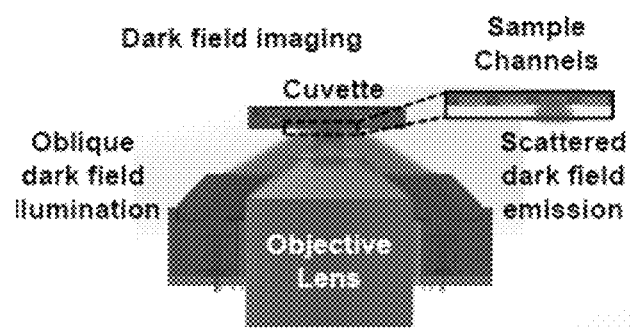
FIG. 14 shows one embodiment of a ring light configuration as described herein.

FIG. 14 shows a still further embodiment using a ring light around the objective lens to illuminate the cuvette that holds the sample being visualized.

Figure 15:
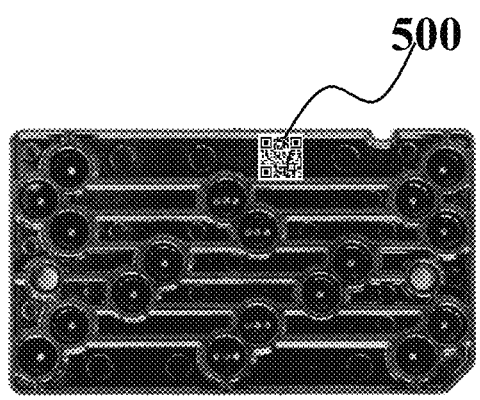
FIG. 15 shows a top-down view of one embodiment of a cuvette as described herein.

FIG. 15 shows an embodiment wherein a data storage unit 500 coupled to the cuvette or other sample holder and provides at least some characteristics about the cuvette used for calibration. In some embodiments, this can be used to compensate for variability in the cuvette chamber dimensions.

In one embodiment of the cuvette, the volume may not be consistent because of thin top layer of the cuvette. In one embodiment, the thickness of the top layer about 200 to 300 microns, or in some embodiments, about 250 microns. There may be height changes, particularly when the chamber height may be in the range of about 20 microns to about 50 microns. In one embodiment, there may be a desire to control within 1% or about 0.2 microns if the chamber is about 20 microns in height. One method to address this issue is to have a tool to measure height very accurately. This can be done during manufacturing and/or optionally, inside the instrument using the cuvette. Optionally, one embodiment is to have a measurement instrument in the analytical device.

In one non-limiting example, bar code can ID the height (at specific locations or provide some mapping or height profile laterally and/or longitudinally). Optionally, it can map the height at multiple locations in the cuvette. Optionally, some embodiments can bar code in the volume. Temperature can be changed and can also change volume. One option is to injection mold. Optionally, make each piece using separate process.

In terms of manufacturing the cuvette, some embodiments may use a plasma bonding technique. In one non-limiting example, a polymer microfluidic bonding is performed by using plasma surface treatment (to enhance surface energy and cleaner surface). (i.e. plasma treat bonding surfaces and press the two surfaces together. It is done. Plasma bonding can keep the channel walls cleaner. Optionally, there may be no local heat induced stress from laser welding, which results in deformation. Optionally, no adhesive is used to join the pieces. Some embodiment may use photolithography the shape the pieces of the cuvette being joined.

While the invention has been described and illustrated with reference to certain particular embodiments thereof, those skilled in the art will appreciate that various adaptations, changes, modifications, substitutions, deletions, or additions of procedures and protocols may be made without departing from the spirit and scope of the invention. For example, with any of the above embodiments, it should be understood that the signal processing techniques described herein are not limited to those assays mentioned in the text, but may also be applied to other assays not expressly listed or described herein.

Additionally, concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a size range of about 1 nm to about 200 nm should be interpreted to include not only the explicitly recited limits of about 1 nm and about 200 nm, but also to include individual sizes such as 2 nm, 3 nm, 4 nm, and sub-ranges such as 10 nm to 50 nm, 20 nm to 100 nm, etc . . . .

The publications discussed or cited herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed. All publications mentioned herein are incorporated herein by reference to disclose and describe the structures and/or methods in connection with which the publications are cited. Fully incorporated herein by reference for all purposes are the following: PCT application PCT/US14/16962 filed Feb. 18, 2014; U.S. Provisional Application Ser. No. 62/534,628 filed Jul. 19, 2017.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. Any feature, whether preferred or not, may be combined with any other feature, whether preferred or not. The appended claims are not to be interpreted as including means-plus-function limitations, unless such a limitation is explicitly recited in a given claim using the phrase "means for." It should be understood that as used in the description herein and throughout the claims that follow, the meaning of "a," "an," and "the" includes plural reference unless the context clearly dictates otherwise. For example, a reference to "an assay" may refer to a single assay or multiple assays. Also, as used in the description herein and throughout the claims that follow, the meaning of "in" includes "in" and "on" unless the context clearly dictates otherwise. Finally, as used in the description herein and throughout the claims that follow, the meaning of "or" includes both the conjunctive and disjunctive unless the context expressly dictates otherwise. Thus, the term "or" includes "and/or" unless the context expressly dictates otherwise.

What is claimed is:

1. A method comprising:
    measuring chamber height of a cuvette;
    encoding a measurement of said chamber height in a data storage unit on the cuvette;
    using said measurement when said cuvette is used in a sample processing device to correct for variability in cuvette chamber dimensions; and
    illuminating a sample chamber of a cuvette with a plurality of light sources, each of said light sources optically coupled to the sample chamber by an optical conduit with an outer cross-sectional shape different from an inner optical core cross-sectional shape that is of the same shape as the sample chamber, wherein the optical conduit is directed to a collimation lens, a color filter, and a focusing lens towards the sample chamber to provide illumination with a non-Gaussian intensity profile.

2. The method of claim 1 wherein the sample chamber has a rectangular shape when viewed top-down and the inner optical core cross-sectional shape is also rectangular.

3. The method of claim 1 wherein the cuvette further comprises a bar code thereon.

4. The method of claim 1 wherein the light sources comprises diode lasers.

5. The method of claim 1 wherein the cuvette is holds the sample for an imaging cytometer.

6. The method of claim 1 wherein the cuvette holds the sample for a flowing cytometer.

* * * * *